United States Patent
Hyma et al.

(10) Patent No.: US 10,750,885 B2
(45) Date of Patent: Aug. 25, 2020

(54) RUGGED LOCKDOWN MERCHANDISE SECURITY APPARATUS

(71) Applicant: Sennco Solutions, Inc., Plainfield, IL (US)

(72) Inventors: Rebecca Hyma, Elk Grove Village, IL (US); Daniel Horvath, Plainfield, IL (US)

(73) Assignee: Sennco Solutions, Inc., Plainfield, IL (US)

( * ) Notice: Subject to any disclaimer, the term of this patent is extended or adjusted under 35 U.S.C. 154(b) by 0 days.

(21) Appl. No.: 15/943,215

(22) Filed: Apr. 2, 2018

(65) Prior Publication Data

US 2018/0279809 A1    Oct. 4, 2018

Related U.S. Application Data

(60) Provisional application No. 62/479,918, filed on Mar. 31, 2017.

(51) Int. Cl.
| | | |
|---|---|---|
| *A47F 7/02* | (2006.01) | |
| *A47F 7/024* | (2006.01) | |
| *E05B 73/00* | (2006.01) | |
| *A47F 5/13* | (2006.01) | |
| *F16B 43/02* | (2006.01) | |
| *F16B 33/00* | (2006.01) | |
| *F16B 9/00* | (2006.01) | |
| *F16B 2/12* | (2006.01) | |

(52) U.S. Cl.
CPC .............. *A47F 7/0246* (2013.01); *A47F 5/13* (2013.01); *E05B 73/0082* (2013.01); *F16B 33/002* (2013.01); *F16B 43/025* (2013.01); *F16B 2/12* (2013.01); *F16B 9/054* (2018.08)

(58) Field of Classification Search
CPC ...... A47F 7/0246; A47F 5/13; E05B 73/0082; F16B 33/002; F16B 43/025; F16B 9/054; F16B 2/12; F16M 13/022; F16M 13/005; F16M 2200/08; A45F 5/00; A45F 2200/0516; A45F 2005/002
See application file for complete search history.

(56) References Cited

U.S. PATENT DOCUMENTS

| | | | | | |
|---|---|---|---|---|---|
| 4,656,848 | A | * | 4/1987 | Rose | E05B 73/0082 70/232 |
| 5,052,199 | A | * | 10/1991 | Derman | E05B 73/0082 70/19 |
| 5,169,114 | A | * | 12/1992 | O'Neill | E05B 73/0082 248/316.4 |
| 5,692,722 | A | * | 12/1997 | Lundagards | E05B 73/0082 248/224.61 |

(Continued)

*Primary Examiner* — Ko H Chan
(74) *Attorney, Agent, or Firm* — Lempia Summerfield Katz LLC

(57) ABSTRACT

An apparatus for securely displaying a product includes a post, a cradle assembly supported by the post, the cradle assembly including a base plate and a plurality of plates slidably engaged with the base plate, each plate of the plurality of plates including a respective arm to engage a respective side of the product, a lock mount fixed to, and extending outward from, the base plate, the post, or the base plate and the post, and a lock disposed in the lock mount, the lock engaging a respective plate of the plurality of plates to fasten the respective plate of the plurality of plates to the base plate.

22 Claims, 5 Drawing Sheets

(56) References Cited

U.S. PATENT DOCUMENTS

| | | | |
|---|---|---|---|
| 6,443,417 B2 * | 9/2002 | Galant | E05B 73/0082 248/553 |
| 7,737,844 B2 | 6/2010 | Scott et al. | |
| D674,803 S * | 1/2013 | Westrup | A45C 3/02 D14/440 |
| 8,526,176 B2 * | 9/2013 | Clark | A61B 5/0002 248/918 |
| 8,711,553 B2 * | 4/2014 | Trinh | A47F 7/0246 248/206.5 |
| 8,814,128 B2 * | 8/2014 | Trinh | A47F 7/024 248/187.1 |
| 8,905,367 B2 * | 12/2014 | Bury | B60R 11/02 224/929 |
| 9,097,380 B2 * | 8/2015 | Wheeler | A47F 7/024 |
| 9,161,466 B2 * | 10/2015 | Huang | H05K 5/0204 |
| 9,163,433 B2 * | 10/2015 | Sedon | E05B 73/0082 |
| 9,285,832 B2 * | 3/2016 | Galant | F16M 11/105 |
| 9,727,085 B2 * | 8/2017 | Weldon | G06F 1/1632 |
| 9,936,823 B2 * | 4/2018 | Galant | F16M 11/041 |
| 9,972,178 B2 * | 5/2018 | Richardson | G08B 13/1454 |
| 2012/0047972 A1 | 3/2012 | Grant et al. | |
| 2013/0301216 A1 * | 11/2013 | Trinh | A47F 7/0246 361/679.58 |
| 2014/0092531 A1 * | 4/2014 | Trinh | A47F 7/024 361/679.01 |
| 2014/0226298 A1 * | 8/2014 | Palmer | H05K 5/0208 361/807 |
| 2015/0336495 A1 * | 11/2015 | Maslakow | B60N 3/00 224/401 |

\* cited by examiner

RUGGED LOCKDOWN MERCHANDISE SECURITY APPARATUS

CROSS-REFERENCE TO RELATED APPLICATION

This application claims the benefit of U.S. provisional application entitled "Heavy Duty Lockdown Security Solution," filed Mar. 31, 2017, and assigned Ser. No. 62/479,918, the entire disclosure of which is hereby expressly incorporated by reference.

BACKGROUND OF THE DISCLOSURE

Field of the Disclosure

The disclosure relates generally to security of merchandise on retail display.

Brief Description of Related Technology

Product merchandise is routinely displayed in retail environments with a security mechanism to deter theft. In some cases, the security mechanism is a tether that ties the merchandise to a display fixture. In other cases, the security mechanism is a security device, such as an electronic tag, affixed to the product and configured to support a proximity detection scheme. In either case, the security mechanism attempts to deter theft while providing a consumer an opportunity to evaluate the product. For instance, the security device may allow the consumer to lift or otherwise inspect the product to assess its function and/or aesthetics. Allowing the consumer to lift the product gives the consumer a better opportunity to assess the weight and feel of the product, as well as interact with the various features and other aspects of the product.

Would-be thieves of consumer electronics in retail environments have become increasingly less deterred by audible alarms that sound when a product is forcibly removed from a display. In many cases, thieves enter retail establishments, forcibly remove the entire security mounting solution and the displayed product from the display, and quickly exit the retail establishments with the alarms sounding. Many existing security solutions in retail establishments use light-duty plastic mounting brackets that are relatively easy to break free from a display fixture. As a result, thieves easily remove thousands of dollars of product from the stores in a matter of seconds.

SUMMARY OF THE DISCLOSURE

In accordance with one aspect of the disclosure, an apparatus for securely displaying a product includes a post, a cradle assembly supported by the post, the cradle assembly including a base plate and a plurality of plates slidably engaged with the base plate, each plate of the plurality of plates including a respective arm to engage a respective side of the product, a lock mount fixed to, and extending outward from, the base plate, the post, or the base plate and the post, and a lock disposed in the lock mount, the lock engaging a respective plate of the plurality of plates to fasten the respective plate of the plurality of plates to the base plate.

In accordance with another aspect of the disclosure, an apparatus for securely displaying a product includes a post, a cradle assembly supported by the post, the cradle assembly including a base plate welded to the post and further including a plurality of plates slidably engaged with the base plate, each plate of the plurality of plates including a respective arm to engage a respective side of the product, and a lock engaging a respective plate of the plurality of plates to fasten the respective plate of the plurality of plates to the base plate. The lock includes a spring-loaded push pin, the spring-loaded push pin engaging the respective plate when pushed into the lock, and the lock is released with a key that disengages the spring-loaded push pin from the respective plate.

In connection with any one of the aforementioned aspects, the apparatus and methods described herein may alternatively or additionally include any combination of one or more of the following aspects or features. The plurality of plates include a pair of lateral plates that slide along a first lateral axis relative to one another to adjust a first lateral dimension of the cradle assembly, the respective arm of each lateral plate of the pair of lateral plates engaging a respective lateral side of the product. Each lateral plate of the pair of lateral plates includes a respective slot oriented along the first lateral axis in which a screw is disposed to fasten the lateral plate to the base plate. The screws that fasten the pair of lateral plates to the base plate are covered by the product when the product is disposed in the apparatus. Each lateral plate includes a corner bracket to engage a respective corner of the product. The respective plate of the plurality of plates slides along a second lateral axis transverse to the first lateral axis to adjust a second lateral dimension of the cradle assembly. The pair of lateral plates are disposed on a first face of the base plate. The respective plate is disposed on a second face of the base plate opposite the first face. The respective plate is positioned to slide between the base plate and the lock mount. The respective plate includes a slot oriented along the second lateral axis. The lock includes a spring-loaded push pin that extends through the slot when the lock fastens the respective plate to the base plate. The lock includes a spring-loaded push pin that extends outward from the lock when the lock resides in an unlocked state, and that extends through the lock mount and an opening in the base plate when the lock resides in a locked state. The base plate is welded to the post. The respective plate has a pair of guide flanges, each guide flange of the pair of guide flanges slidably engaging a respective sidewall of a pair of sidewalls of the lock mount. Each sidewall of the pair of sidewalls has a portion spaced from the base plate to define a gap in which the respective plate is disposed. The post includes a tube and a threaded rod fixedly disposed in the tube. The apparatus further includes an anti-rotation washer threadably engaged with the threaded rod, the anti-rotation washer having a plurality of flanges configured to engage a channel in a display fixture to which the apparatus is mounted. The respective arm of each plate of the plurality of plates is positioned to not obstruct a side button of the product. The respective arm of at least one plate of the plurality of plates is positioned to obstruct access to a card slot of the product. The cradle assembly, the lock mount, and the post are composed of tamper-proof, heat-treated steel. The lock is centered on the cradle assembly. The apparatus further includes a lock mount welded to the base plate. The lock is disposed in respective openings in the base plate and the lock mount.

BRIEF DESCRIPTION OF THE DRAWING FIGURES

For a more complete understanding of the disclosure, reference should be made to the following detailed descrip- FIG. 1 is a front, perspective view of an apparatus for securely displaying a product in accordance with one example.

Figure 1:
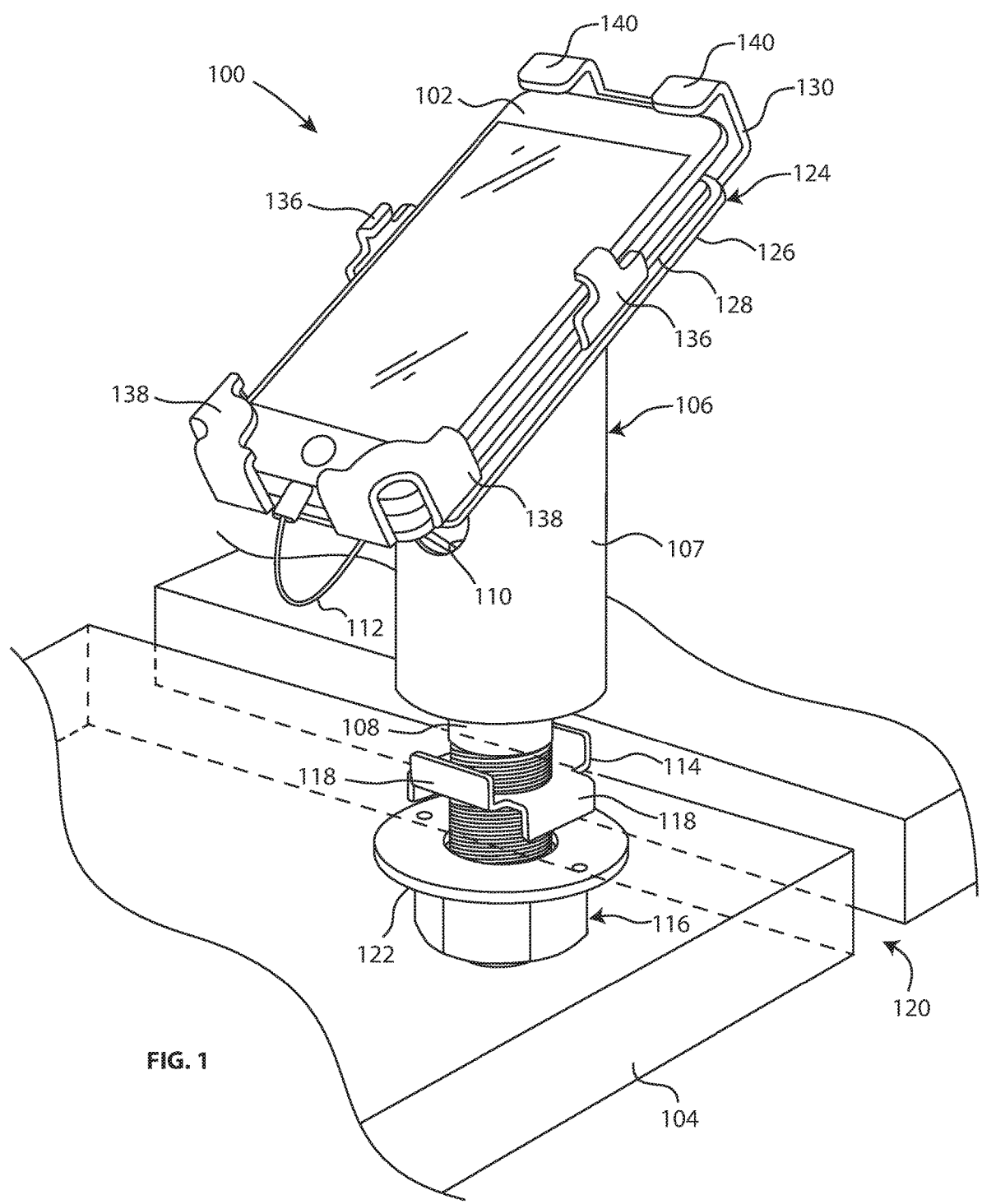

The disclosed apparatuses are susceptible of embodiments in various forms. Specific embodiments of the invention are illustrated in the drawing (and will hereafter be described) with the understanding that the disclosure is intended to be illustrative, and is not intended to limit the invention to the specific embodiments described and illustrated herein.

DETAILED DESCRIPTION OF THE DISCLOSURE

An apparatus that secures merchandise on display is described. The merchandise is often an electronic device, but other products may be secured. The apparatus secures, or locks down, the merchandise or product to a display fixture in a rugged manner. The apparatus may thus be used in retail and other environments to securely display products while eliminating or substantially reducing theft. The retail environment may consequently not need to rely on tethers, security tags, proximity sensors, or other security mechanisms to deter theft. Although described as a stand-alone security solution, the disclosed apparatus may be used in conjunction with other security mechanisms.

The apparatus provides a heavy-duty mounting for securing the product to the display fixture, avoiding the limitations of other mounting apparatuses. Traditional mounting apparatuses are relatively easy to break free from a display fixture. For instance, a thief can easily break a plastic mounting apparatus and remove the displayed product. The disclosed heavy-duty lock-down mounting apparatus cannot be easily removed from the display. The disclosed apparatus includes a plate-based cradle assembly with a lock to securely hold the product in place. In one aspect, the apparatus is constructed of tamper-proof, heat-treated steel. The tamper-proof, heat-treated steel is welded to wrap-around the product and has no breaks, thereby preventing the corner to be bent away from the product. The tamper-proof, heat-treated steel also prevents the apparatus from being removed from the display fixture by a thief.

Mounting apparatuses must secure the products while also allowing the products to be viewed and interacted with. The disclosed apparatus provides a heavy-duty mounting for securing the product to the display fixture while still allowing the product to be viewed and interacted with by potential customers and/or other users. For instance, the plate-based cradle assembly has arms that hold on to the edges of the product without covering the front or sides of the product that require user interaction.

The apparatus is configured for convenient use despite its rugged nature. For instance, the plates of the cradle assembly are capable of being locked in position by a lock without forcing a user to use a tool. In some cases, the lock includes a spring-loaded push pin. The apparatus is also configured for convenient unlocking. For instance, an unlocking mechanism allows for easy removal of the product from the apparatus. In some cases, the unlocking mechanism includes a barrel lock option. The unlocking mechanism thus provides a convenient and secure solution to prevent theft while allowing authorized personnel to easily remove the product from the apparatus.

The disclosed apparatus is capable of being adjusted to hold a variety of products. For instance, the plates of the cradle assembly are slidably connected to a base plate to accommodate products with a variety of lengths and widths. In some cases, the plates of the cradle assembly are attached to the base plate using notched slots and held in place with set screws.

Although described and shown herein in connection with a smartphone, the disclosed apparatus is not limited to securing any particular type of product. The adjustable nature of the disclosed apparatus allows the dimensions of the product to vary considerably. A variety of electronic and non-electronic products may be secured via the disclosed apparatus.

Figure 2:
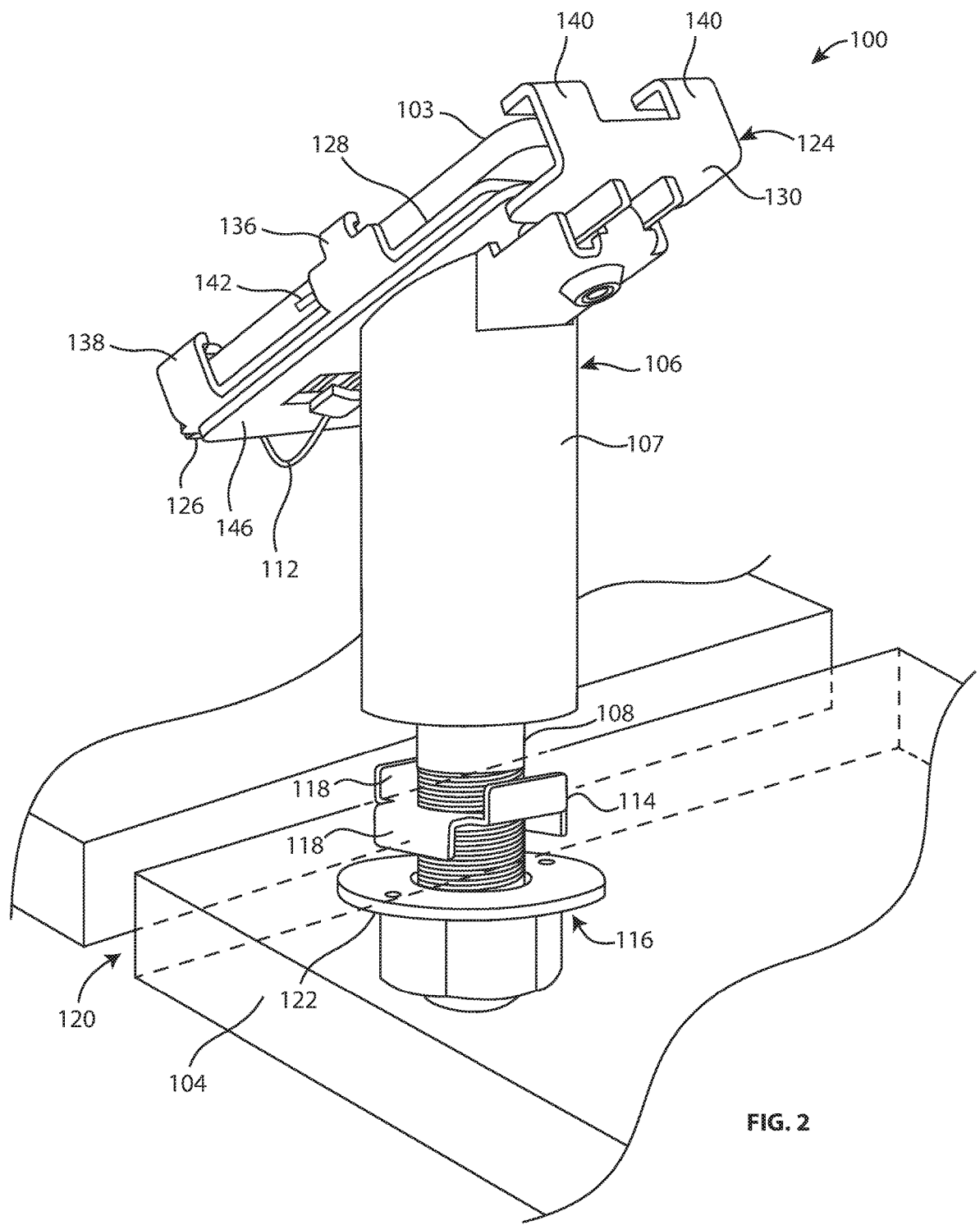
FIG. 2 is a rear, perspective view of the apparatus of FIG. 1 in connection with the display of another product of a different size.
Figure 3:
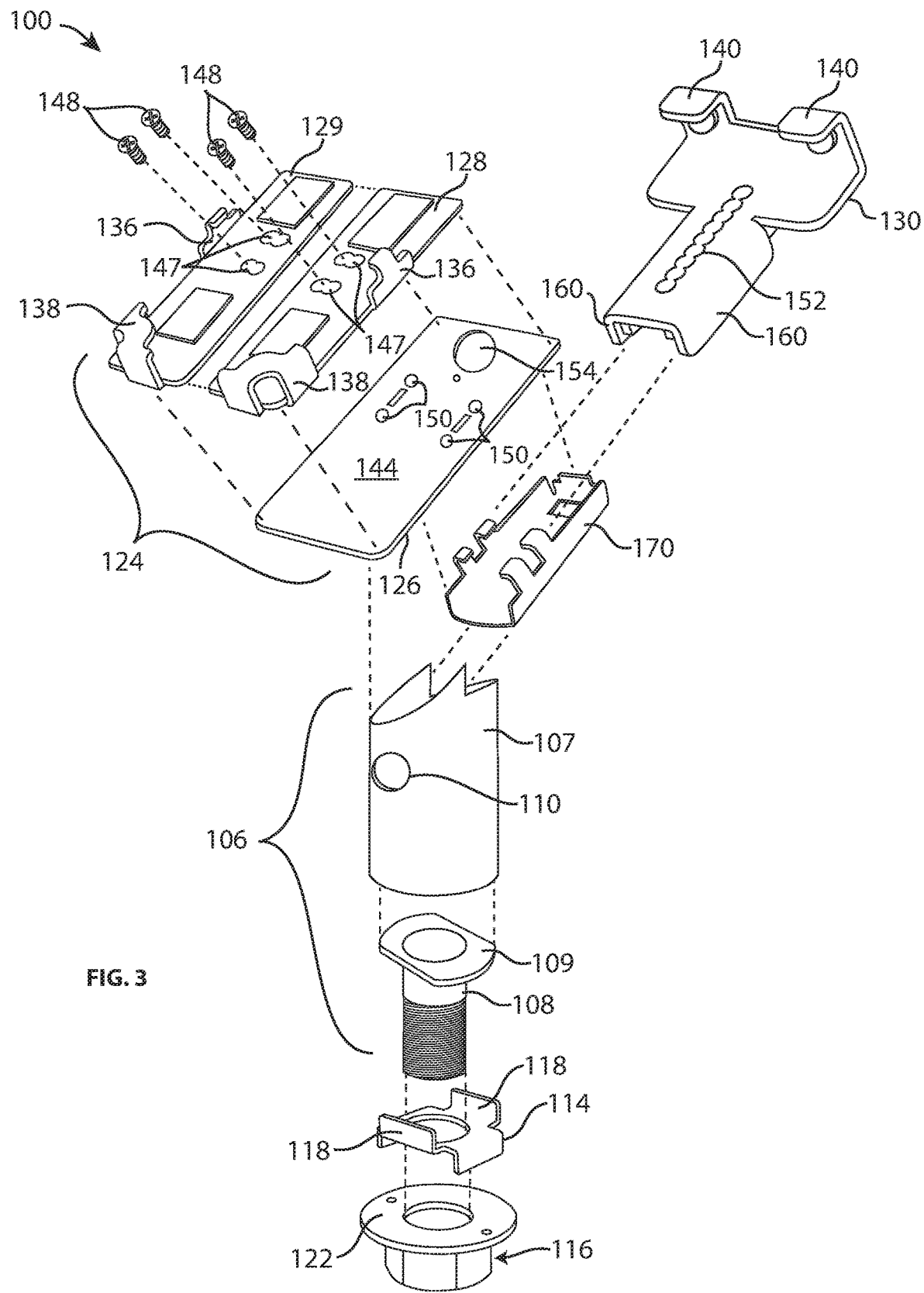
FIG. 3 is a front, perspective, exploded view of the apparatus of FIG. 1 to depict in greater detail a post and a cradle assembly of the apparatus in accordance with one example.

Turning to the drawing figures, FIGS. 1-3 depict an apparatus 100 configured for securely displaying product. The apparatus 100 is configured to accommodate products of different sizes. The lateral dimensions and/or thickness may vary. In this case, the apparatus 100 is depicted with a product 102 in FIG. 1, and a product 103 in FIG. 2. The products 102, 103 may be a smartphone or another electronic device. In the examples shown, the product 103 is thicker and wider than the product 102. Any one or more of the product dimensions may vary. The products 102, 103 may be displayed for sale and/or part of an exhibit or other display of items for sale. The nature of the products 102, 103 may vary. For example, the products 102, 103 may be a laptop, computer, tablet, or other portable electronic product. In other cases, the apparatus 100 is used to display non-electronic products. The size, form factor, and other characteristics of the products 102, 103 may thus vary considerably.

The display may be in a store or other retail site or other environment. The retail display and environment may have other security monitoring systems in operation to prevent or deter theft of the products 102, 103 and other merchandise on display. For instance, a wireless security system may be provided, such as the system described in U.S. Patent Publication No. 2016/0307415 ("Apparatus, System and Method for Monitoring a Device within a Zone"), the entire disclosure of which is hereby incorporated by reference. Alternatively or additionally, tethers or other cable-based security measures may be used, including, for instance, cable-based apparatus having a retractable reel and other components for securing merchandise to a display fixture as described in U.S. Patent Publication No. 2014/0059828 ("Apparatus, System and Method for Securing, Attaching and/or Detaching a Device to a Fixture"), the entire disclosure of which is hereby incorporated by reference.

The apparatus 100 is configured to provide rugged security to lock-down products for display and/or products for use by a potential buyer. Such heavy-duty security may replace or augment the security measures established by other items in the retail environment. For instance, the apparatus 100 may provide redundancy by being implemented with the wireless security system described above. This redundancy may be useful in circumstances in which the wireless system fails or is otherwise disabled.

The apparatus 100 is configured to secure the product 102, 103 to a display fixture 104 of the retail environment. The apparatus 100 is mounted or otherwise connected to the display fixture 104. The apparatus 100 extends outward (e.g., upward) from the display fixture 104. In the example of FIG. 1, the display fixture 104 is a table, shelf, stand, or other horizontally oriented structure. The orientation and other characteristics of the display fixture 104 may vary from the example shown. For instance, the display fixture 104 may be vertically oriented such that the apparatus 100 extends laterally outward rather than upward from the display fixture 104.

The apparatus 100 includes a post 106. The post 106 connects the product 102, 103 to the display fixture 104. In the example shown, the connection establishes an elevated position for the product 102, 103 relative to the display fixture 104. In other cases, the post 106 may space the product 102, 103 from the display fixture 104 in other directions. The orientation of the post 106 may thus vary.

In the example of FIGS. 1-3, the post 106 includes a tube 107, a rod 108, and a weld plate 109 (FIG. 3) to connect the tube 107 and the rod 108. The rod 108 is disposed within the tube 107. The rod 108 extends outward from the tube 107 to engage the display fixture 104. To that end, the rod 108 may be threaded. In other cases, the post 106 includes multiple rods. For example, a pair of rods may be disposed within and extending from the tube 107 to engage the display fixture. In the example of FIGS. 1-3, the rod 108 is a partially-threaded rod. A non-threaded part of the rod 108 is welded or otherwise secured to the weld plate 109. The weld plate 109 is, in turn, welded or otherwise secured to the tube 107, thereby connecting the rod 108 to the tube 107 to form the post 106. In other cases, the weld plate 109 may be secured to the tube 107 via a press fit connection.

The post 106 may be configured to accommodate one or more features of the display. For instance, the post 106 may be configured to facilitate electrical, data or other connections to the product 102, 103. In the example shown, the post 106 includes a routing channel or other interior space that terminates in an opening 110 in the tube 107 to allow a cable 112, such as a product charging or other power cable, to be connected to the product 102, 103. After exiting the opening 110, the cable 112 may be disposed in one or more cable guides, such as a guide hook in a base plate shown in FIG. 2. The cable guides and the routing channel may be used for additional or alternative purposes. For instance, in examples with an electronic lock, the routing channel may be used to accommodate a power cable for the electronic lock.

The post 106 may be composed of one or more materials to provide a rugged connection to the display fixture 104. In this example, one or more components of the post 106 are constructed of a metal or other rigid material, such as heat-treated steel. The steel (or other material) may have a gauge and/or other characteristics to render the post 106 tamper-proof. The use of steel or other metal materials allows the components of the post 106 to be welded to one another. The welding may be useful to reduce or eliminate breaks or other spacing between the components. The lack of breaks prevents tampering. A wide variety of other heavy-duty materials may be used, such as aluminum or high-strength plastic.

The construction, configuration, and other characteristics of the post 106 may vary considerably from the example shown. For instance, the post 106 may include additional, fewer, or alternative components. The post 106 may not include the tube 107 and/or the weld plate 109 in some cases. Any number of the components of the post 106 may be integrated with one another to any desired extent. For example, some or all of the components of the post 106 may be machined or otherwise formed as a single component.

In the example of FIGS. 1-3, an upper end of the post 106 is angled to orient the product 102, 103 at an angle as shown. The angle may vary. The upper end of the post 106 may vary accordingly. The upper end may also include a notch to accommodate a lock mount as described below.

The shape and dimensions of the post 106 may vary in other ways. For example, the post 106 may have a different cross-section, such as cylindrical, rectangular, etc. The diameter or other lateral dimension(s) of the post 106 may be smaller or larger than the lateral dimension(s) of the product 102, 103.

The apparatus 100 includes one or more components directed to securing the post 106 to the display fixture 104. The components may be engaged with the rod 108 or other component of the post 106. In the example of FIGS. 1-3, the apparatus 100 includes an anti-rotation washer 114 and a nut 116. The anti-rotation washer 114 prevents the post 106 from rotating relative to the nut 116. The anti-rotation washer 114 is threadably engaged with the threaded rod 108 and has a plurality of flanges 118 configured to engage a channel 120 (FIGS. 1 and 2) in the display fixture 104. Any one of the flanges 118 not engaged in the channel 120 in the display fixture 104 may be disposed in the space between the weld plate 109 and the tube 107. The channel 120 may be a slot or gap in the display fixture 104. For example, the channel 120 may extend across the width of a display table. The anti-rotation washer 114 thus prevents the apparatus 100 from being rotated and unscrewed from the display fixture 104.

Other anti-rotation mechanisms may additionally or alternatively be used. For example, a jam nut may be threadably engaged with the rod 108. The anti-rotation mechanism may vary in connection with one or more characteristics of the display fixture 104. For instance, an anti-rotation O-ring may be used in connection with display fixtures having a round opening rather than the channel 120. Rotation may alternatively or additionally be prevented via use of multiple rods.

The apparatus 100 may include additional or fewer components directed to securing the post 106 to the display fixture 104. For instance, the nut 116 may be the sole mechanism for securing the post 106 to the display fixture 104. In those and other cases, the nut 116 may include a washer 122 welded or integrally formed with the remainder of the nut 116. As shown in FIGS. 1-3, the washer 122 may include holes for set screws. After the nut 116 is tightened to mount the post 106, the set screws are screwed into the display fixture 104, thereby providing additional security.

The apparatus 100 may include additional components directed to securing the post 106 to a permanent fixture. For instance, the post 106 may be secured to a wall. For example, the anti-rotation washer 114 may be tethered to a stud in the wall or other fixture of the retail environment. In some cases, the tether may be a steel cable. In some cases, one or more of the flanges 118 of the anti-rotation washer 114 may have holes through which the cable passes. A tether other than a steel cable may be used. The tether may engage alternative or additional washers or other elements of the post 106. In such cases, the washer or other element may have a hole through which the cable passes.

The apparatus 100 includes a cradle assembly 124 supported by the post 106. The cradle assembly 124 is configured to engage and hold the product 102, 103 in place. One or more components of the cradle assembly 124 are welded or otherwise fixedly secured to the post 106. The cradle assembly 124 may be considered to be or include a set of brackets that engage the product 102, 103. The positioning of the brackets or other components of the cradle assembly 124 is adjustable to accommodate products of various sizes.

Adjustment of the cradle assembly 124 involves an arrangement of sliding plates. As shown in FIGS. 1-3, the cradle assembly 124 includes a base plate 126 and a plurality of plates 128, 129 (FIG. 3), 130. The base plate 126 is welded or otherwise secured to the post 106. The plates 128-130 are slidably engaged with the base plate 126. The plates 128-130 slide laterally inward and outward to adjust the lateral dimension(s) of the cradle assembly 124 and, in so doing, engage the product 102, 103.

The plate arrangement may include two or more abutting plates. In the example of FIGS. 1-3, the plates 128, 129 are disposed as a pair of abutting plates. In the example shown, the plates 128, 129 engage opposite lateral sides of the product 102, 103. The pair of plates 128, 129 may accordingly be referred to herein as lateral plates. The lateral plates 128, 129 may also engage a bottom side of the product 102, 103, as described below.

The plate 130 engages a top side of the product 102, 103. The plate 130 may accordingly be referred to herein as a top plate.

The plates 128-130 are not entirely planar. As described below, each plate 128-130 includes one or more arms (e.g., bracket arms) that project outward from the plane of the plate 128-130. Each arm engages one or more sides of the product 102, 103. The term "plate" is accordingly used herein to include objects having at least a planar portion or segment. The planar portions of the plates 128-130 allow the plates 128-130 to slide relative to one another and relative to the base plate 126.

Figure 4:
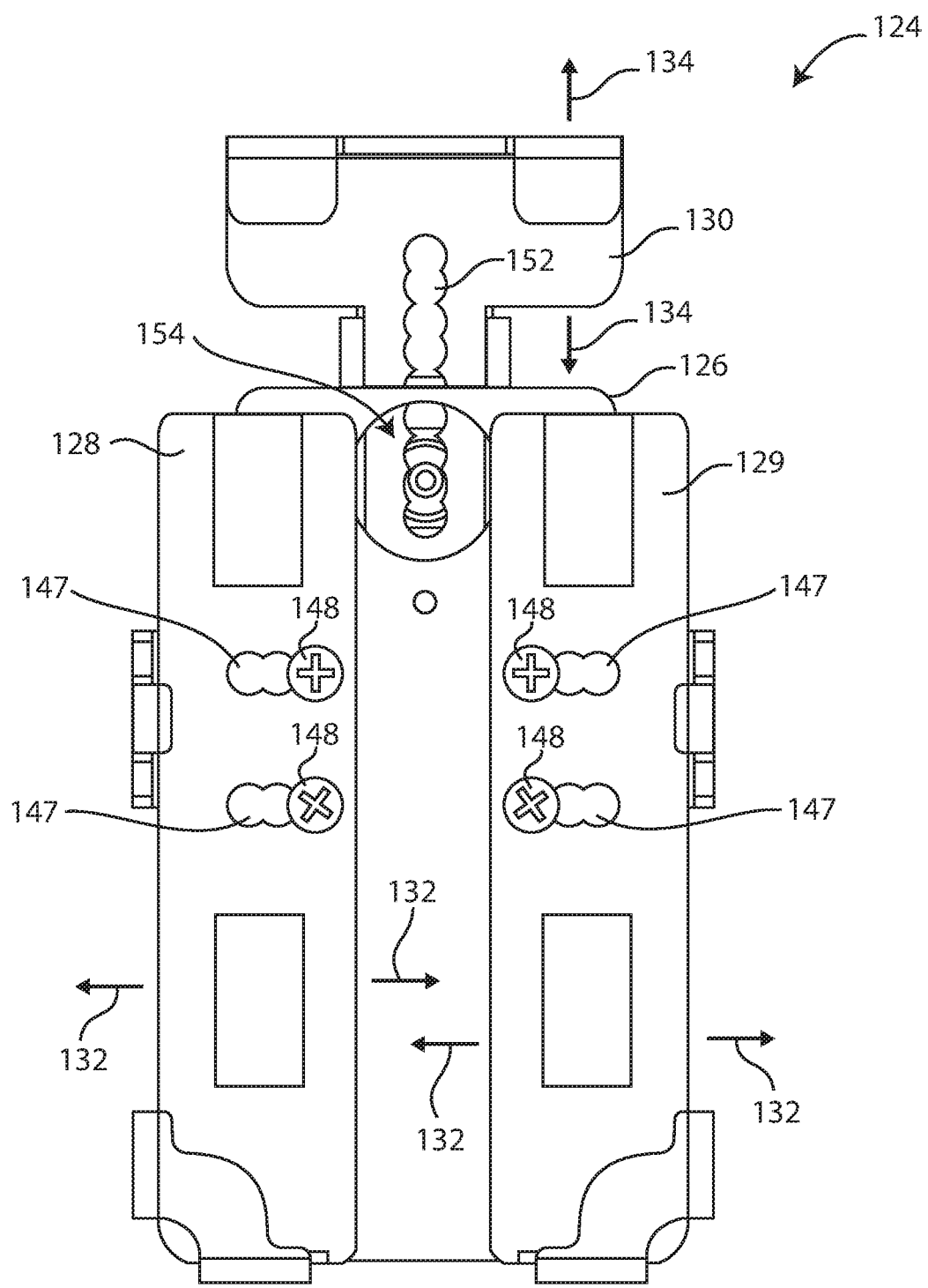
FIG. 4 is a front, elevational view of a cradle assembly to depict the adjustability of the cradle assembly in accordance with one example.

The plates 128-130 slide in multiple directions to accommodate multiple dimensions (e.g., height, width) of the product 102, 103. In this example, as shown in FIG. 4, the pair of lateral plates 128, 129 slide along a lateral axis 132 relative to one another to adjust a first lateral dimension of the cradle assembly 124. The lateral axis 132 corresponds with a side-to-side (e.g., left-to-right) dimension of the product 102, 103. In other cases, the pair of lateral plates 128, 129 move in a direction offset from the lateral axis 132. The top plate 130 slides along a lateral axis 134 to adjust another lateral dimension of the cradle assembly 124. The lateral axis 134 corresponds with the top-to-bottom (e.g., height) dimension of the product 102, 103. The lateral axis 134 is transverse to the lateral axis 132.

The sliding adjustment of the plate arrangement allows respective arms (e.g., bracket arms) of the plates 128-130 to engage the product 102, 103. Each arm engages one or more sides of the product 102, 103. In the example of FIGS. 1-3, each of the lateral plates 128, 129 includes a respective side arm 136 and a respective corner bracket arm 138. Additional, fewer or alternative arms may be included. For instance, the lateral plates 128, 129 may not include the side arms 136 in other cases. The top plate 130 includes a pair of bracket arms 140 that engage a top side of the product 102, 103. The top plate 130 may include additional, fewer or alternative arms. For instance, the arms 140 may be configured as corner bracket arms.

The arms of one or more of the plates 128-130 may be positioned to facilitate the display of the product 102, 103. For instance, the arms may not substantially cover the front or sides of the product 102, 103. The arms may be positioned to not obstruct access to volume control and other side buttons of the product 102, 103. Various ports (e.g., input/output ports) may be similarly free from obstruction by the arms. All buttons and inputs of the product 102, 103 may thus be accessed. The product 102, 103 may thus be viewed and interacted with in a normal fashion. The cradle assembly 124 thus secures the product 102, 103 while not obstructing the functionality thereof.

One or more of the arms, however, may be positioned to prevent, limit or otherwise obstruct access to a button, port, or other feature of the product 102, 103. For example, one of the arms 136 may be positioned to obstruct access to a card slot 142 of the product 103, as shown in the example of FIG. 2. The card slot 142 may be a SIM card slot. Prohibiting access to the SIM card or other slot may be useful while the product 103 is secured by the cradle assembly 124. Additional, fewer, or alternative slots or ports, such as a memory card slot, may be obstructed.

As best shown in FIG. 2, the sliding plates 128-130 may be disposed on opposed sides of the base plate 126. In this example, the pair of lateral plates 128, 129 are disposed on, and slides along, a front face 144 (FIG. 3) of the base plate 126. The top plate 130 is disposed on, and slides along, a rear face 146 (FIG. 2) of the base plate 126. The base plate 126 may or may not be disposed between the respective plates of the plates 128-130 in other cases. For instance, all of the plates 128-130 may be disposed on, and slide along, the front face 144 in other cases.

The plates 128-130 are secured to the base plate 126 via a number of fasteners. In the example shown, the fasteners extend through slots or other holes in the plates. The holes are shaped or otherwise configured to facilitate the positioning of the plates 128-130 relative to the base plate 126. In the example of FIGS. 3 and 4, each lateral plate 128, 129 includes a slot 147. Each slot 147 may be notched as shown to define a number of discrete positions for the plate 128, 129. In this case, each slot 147 is oriented along the lateral axis 132. In other cases, each slot 147 is oriented at an angle to the lateral axis 132. An angled orientation may be used to increase the amount of allowable displacement the lateral plates 128, 129, thereby accommodating wider products.

As shown in FIGS. 3 and 4, screws 148 are used to secure the lateral plates 128, 129 to the base plate 126. Access to the screws 148 is limited when the product 102, 103 is disposed in the apparatus 100. The screws 148 are covered by the product 102, 103 when the product 102, 103 is disposed in the apparatus 100. Other fasteners may be used, including, for instance, pins or rivets.

The slots 147 allow the pair of lateral plates 128, 129 to move along the lateral axis 132 (FIG. 4) in order to accommodate a width or other lateral dimension of the product 102, 103. In this case, the dimension is a width of the product 102, 103. For example, FIG. 1 shows the lateral plates 128, 129 accommodating a narrower product 102, in which case the base plate 126 protrudes beyond the lateral plates 128, 129. FIG. 2 shows the lateral plates 128, 129 accommodating a wider product 103, where the lateral plates 128, 129 have been displaced outward. The lateral plates 128, 129 thus protrude beyond the base plate 126. The lateral plates 128, 129 accommodate products of different widths in this manner.

The base plate 126 has a number of holes or other openings in which the screws 148 are received. In this example, the base plate 126 has tapped holes 150 to accept the screws 148, as shown in FIG. 3. The location of the tapped holes 150 allows the screws 148 to be covered by the product 102, 103, as shown in FIGS. 1 and 2. The tapped holes 150 may also be created using a threaded insert nut pressed into holes in the base plate 126. The screws 148 may be counter-sunk screws.

The top plate 130 may include a number of holes or other openings to facilitate the fastening of the top plate 130 to the base plate 126. In this case, the top plate 130 includes a slot 152, as shown in FIGS. 3 and 4. The slot 152 may be notched to define a number of discrete positions for the top plate 130. The slot 152 may be oriented along the lateral axis 134 (FIG. 4) to accommodate a height or other lateral dimension of the product. As described below, the fastening mechanism for the top plate 130 may be or include a lock of the apparatus 100. In other cases, screws or other fasteners may be used to secure the top plate 130. Alternatively or additionally, a locking mechanism may be used in connection with one or both of the lateral plates 128, 129.

As shown in FIGS. 3 and 4, the base plate 126 has one or more openings directed to securing the top plate 130. In this example, the base plate 126 has a lock opening 154. The lock opening may be configured to receive one or more components of a lock, such as a lock housing. Additional or alternative openings may be provided. For instance, the base plate 126 may have one or more screw holes.

The top plate 130 may be configured to engage components of the assembly in addition to the base plate 126. In the example shown, the top plate 130 is configured to also engage a lock of the apparatus 100. As best shown in FIG. 3, the top plate 130 has a narrowed section extending downward from a wider section that carries the bracket arms 140. In this example, sides of the top plate 130 are bent outward to form a pair of guide flanges 160. Each guide flange 160 is configured to slidably engage a component of the apparatus 100. In this case, the component is a lock mount (e.g., a sidewall of a lock mount), which is described in greater detail below. The guide flanges 160 guide the top plate 130 to move along the lateral axis 134 (FIG. 4).

Soft sponge or rubber bumpers or other materials may be provided on one or more surfaces of the plate assembly 124. The bumpers may protect the product 102, 103 from getting scratches and other damage. In the example shown, bumpers are provided on front facing surfaces of the lateral plates 128, 129. Further bumpers are provided on inward surfaces of the arms 140. Additional, fewer or alternative bumpers may be provided.

The plate assembly 124 may be disassembled to provide further adjustability. One or more of the plates may be replaced with plates of differing size or shape. The difference in size or shape may be useful to accommodate a greater range of product sizes and shapes.

The positioning, orientation, and other aspects of the plate arrangement may vary from the example shown. For instance, the pair of lateral plates may slide along the lateral axis 134 in other cases.

The composition of the components of the cradle assembly 124 may be similar to the composition of the post 106. For instance, one or more components of the cradle assembly 124 may be composed of tamper-proof, heat treated steel. The respective bracket or other arms of the plates 128-130 may be integrally formed with the remainder of the respective plate. Alternatively, the arms may be connected or otherwise formed using fully-welded construction without any breaks or weak points. Other techniques to prevent tampering may be used. Other rugged materials may be used as described above.

Figure 5:
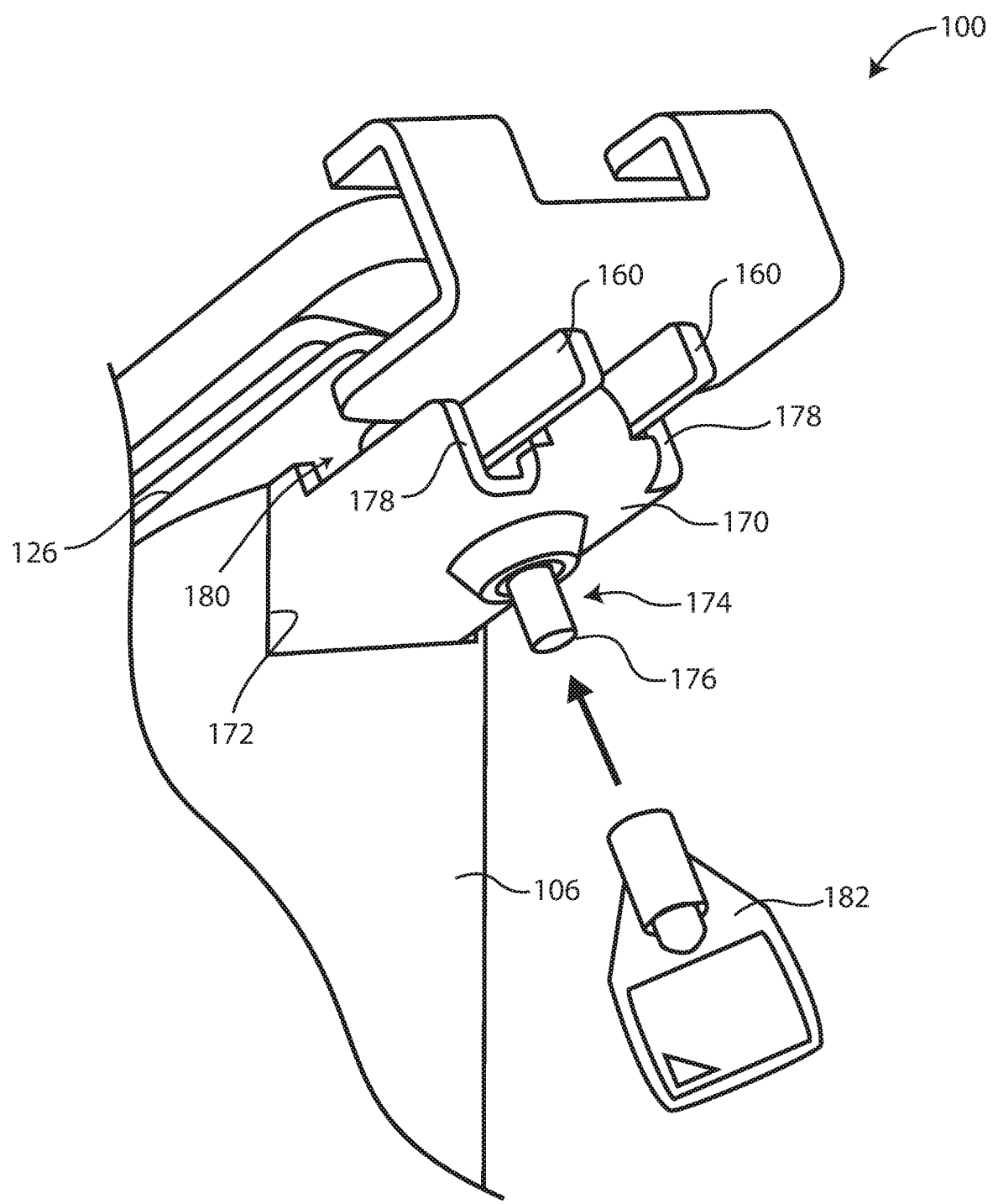
FIG. 5 is a rear, perspective, detailed view of the apparatus of FIG. 1 to depict in greater detail a spring-loaded push pin lock of the apparatus in accordance with one example.

FIG. 5 shows the apparatus 100 in greater detail to depict a lock mechanism. In this example, the apparatus 100 includes a lock mount 170 to support the lock mechanism. The lock mount 170 may be fixedly secured to, and extend outwardly from, the base plate 126 and/or the post 106. In the example shown, the lock mount 170 is welded to both the base plate 126 and the post 106. The welding of the post 106 and the lock mount 170 may be facilitated by a notch 172 at the upper end of the post 106. The notch 172 is also shown in FIG. 3. The notch 172 allows the lock mount 170 to extend into the post 106. The lock mount 170 extends rearwardly from the notch 172 and the post 106 as shown.

An example of the lock mount 170 is also shown in the exploded view of FIG. 3. The shape and other characteristics of the lock mount 170 may vary from the example shown.

The lock mount 170 may be directly or indirectly fixed to the base plate 126 and/or the post 106. For example, one or more intervening components may be disposed between the lock mount 170 and the post 106 to provide additional space between the base plate 126 and the lock mount 170 for the top plate 130.

The apparatus 100 further includes a lock 174 disposed in the lock mount 170. The lock 174 may be disposed in respective openings in the base plate 126 and the lock mount 170. In this example, the lock 174 engages the top plate 130 to fasten the top plate 130 to the base plate 126. The lock 174 may include a spring-loaded push pin 176 that engages the top plate 130 when pushed into the lock 174. The lock 174 thus locks the top plate 130 into position with the base plate 126.

The lock mount 170 may include one or more sidewalls 178. In the example shown, the lock mount 170 includes a pair of sidewalls 178. As shown in FIG. 5, the sidewalls 178 engage the guide flanges 160 of the top plate 130 to guide the top plate 130.

The sidewalls 178 may be welded or otherwise secured to the base plate 126. However, in the example of FIG. 5, each sidewall 178 has a portion spaced from the base plate 126 to define a gap 180 in which the top plate 130 is disposed. The gap 180 allows the top plate 130 to slide relative to the base plate 126 between the lock mount 170 and the base plate 126.

The lock mount 170 may be welded to the tube 107 and/or the base plate 126 using fully-welded construction without any breaks or weak points, thereby preventing tampering or removal of the product 102, 103. The lock mount 170 may be constructed and composed as described above in connection with other components of the apparatus 100.

FIG. 5 shows the apparatus 100 in greater detail to depict the operation of the lock 174. In some cases, a key 182 is used to disengage and engage the lock 174. In the example shown, the key 182 has a cylindrical end that engages a circular opening in an outward face of the lock 174. The configuration of the lock 174 may vary considerably from the example shown. For instance, the lock 174 may have a non-circular opening. The shape of the key 182 may vary accordingly.

In the example shown, the lock 174 is configured as, or includes, a barrel lock. The key 182 may thus be configured as, or include, a barrel lock key. The mechanical barrel lock displaces the spring-loaded push pin 176 to unlock the top plate 130 for product removal. The mechanical barrel lock secures the top plate 130 to prevent the product 102, 103 from being removed from the display fixture 104. Additionally, the barrel lock key is not easily reproducible and is available with many unique "codes," enhancing the security of the barrel lock. When using a unique code, each barrel lock in a location may be keyed the same, thereby allowing a single key to release each product 102, 103 at the location. Alternatively, different keys may be provided for each product, or for different groups of products.

FIG. 5 depicts the lock 174 in an unlocked state. In that state, the spring-loaded push pin 176 extends outward from the lock 174 when the lock 174 resides in an unlocked state. FIG. 2 depicts the lock 174 in a locked state. In that state, the push pin 176 extends through the lock mount 170, the opening 154 in the base plate 126, and the slot 152 in the top plate 130. The top plate 130 is accordingly held in place relative to the base plate 126.

The spring-loaded push pin 176 provides for a quick connect feature, thereby allowing for easy product attachment and security. For example, by using the spring-loaded push pin 176, no keys or tools are required to secure the product into the apparatus 100. In the example shown, securing the product 102, 103 starts with sliding the lateral plates 128, 129 (FIGS. 1-3) inward until the sides and bottom of the product 102, 103 are engaged. The product 102, 103 may then be removed temporarily to tighten the screws 148 (FIG. 3). After the product 102, 103 is returned to the cradle, a user then slides the top plate 130 downward until the top side of the product is engaged. The spring-loaded push pin 176 is then pushed in to secure the top plate 130 without a key or other tool. The spring-loaded push pin 176 fits into one of the holes in the notched slot 152 of the top plate 130 to lock the top plate 130 into position. Once the spring-loaded push pin 176 is pushed in, the product 102, 103 is secured.

Removal of the product 102, 103 from the apparatus 100 is also facilitated by the lock 174. In the example shown, the lock 174 supports a quick disconnect feature. In this case, the lock 174 releases the top plate 130 to allow the product 102, 103 to be removed. The lock 174 is released with the key 182 that disengages the spring-loaded push pin 176 from the top plate 130. Once unlocked, a user can slide the top plate 130 outward, thereby allowing the product 102, 103 to be removed from the cradle assembly 124.

Other types of pins may be used. For instance, the spring-loaded push pin 176 may be replaced with a conventional locking pin or an electronically locking pin to secure the device.

Other aspects of the lock 174 may also vary. For instance, the lock 174 may be a mechanical or electrical lock. In such cases, a battery or AC powered electric actuator may be used to read an electronic key (not shown) and displace the spring-loaded push pin 176 to unlock the top plate 130. For instance, the electronic key may be or include a serial iButton Sennco "DA" key, an RFID tag, or another electronically readable key. The electronic key may be configured in accordance with one of millions of different key codes and may be learned or otherwise paired with an electric lock mechanism.

In one example, the lock 174 is centered on the cradle assembly 124, allowing for ambidextrous operation. The lock 174 however may be located anywhere on the cradle assembly 124.

As discussed above, all or part of the apparatus 100 may be constructed of tamper-proof, heat treated steel. For example, the cradle assembly 124, the lock mount 170, and the post 106 may be composed of tamper-proof, heat-treated steel. In this case, the steel is stress relieved to achieve a resultant hardness of 42-45 HRC after the parts are formed and/or welded.

Described above is an apparatus for providing a heavy-duty mounting for securing a product to a display fixture in all three axes (X, Y, and Z). The apparatus includes a cradle assembly for receiving the product, the cradle assembly configured to secure each side of the product and a post configured to support the cradle assembly. A nut may be used to secure the post to a display, where the nut has a washer configured to accept set screws to prevent removal of the nut. The cradle assembly may be configured to adjust to a width and height of a product using adjustable plates. In some cases, the cradle assembly is secured by a lock using a spring-loaded pin that may be engaged without a key or tool. The cradle assembly and the post may be made from fully-welded, heat treated steel.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. An apparatus for securely displaying a product, the apparatus comprising:
   a post;
   a cradle assembly supported by the post, the cradle assembly comprising a base plate and a plurality of plates slidably engaged with the base plate, each plate of the plurality of plates comprising an arm, the arms of first, second, and third plates of the plurality of plates engaging first, second, and third sides of the product, respectively;
   a lock mount fixed to, and extending outward from, the base plate, the post, or the base plate and the post; and
   a lock having an opening configured to be engaged by a key, the lock being disposed in the lock mount, the lock engaging the first plate of the plurality of plates to fasten the first plate of the plurality of plates to the base plate;
   wherein the second and third plates are a pair of lateral plates that slide along a first lateral axis relative to one another to adjust a first lateral dimension of the cradle assembly, the arms of the second and third plates engaging first and second lateral sides of the product, respectively.

2. The apparatus of claim 1, wherein each lateral plate of the pair of lateral plates comprises a slot oriented along the first lateral axis in which a screw is disposed to fasten the lateral plate to the base plate.

3. The apparatus of claim 2, wherein the screws that fasten the pair of lateral plates to the base plate are covered by the product when the product is disposed in the apparatus.

4. The apparatus of claim 1, wherein each lateral plate comprises a corner bracket to engage a corner of the product.

5. An apparatus for securely displaying a product, the apparatus comprising:
   a post;
   a cradle assembly supported by the post, the cradle assembly comprising a base plate and a plurality of plates slidably engaged with the base plate, each plate of the plurality of plates comprising an arm, the arms of first, second, and third plates of the plurality of plates engaging first, second, and third sides of the product, respectively;

a lock mount fixed to, and extending outward from, the base plate, the post, or the base plate and the post; and a lock disposed in the lock mount, the lock engaging the first plate of the plurality of plates to fasten the first plate of the plurality of plates to the base plate, wherein the plurality of plates comprise a pair of lateral plates that slide along a first lateral axis relative to one another to adjust a first lateral dimension of the cradle assembly, the arm of each lateral plate of the pair of lateral plates engaging a lateral side of the product, wherein the first plate of the plurality of plates slides along a second lateral axis transverse to the first lateral axis to adjust a second lateral dimension of the cradle assembly.

6. The apparatus of claim 5, wherein:

the pair of lateral plates are disposed on a first face of the base plate;

the first plate is disposed on a second face of the base plate opposite the first face; and the first plate is positioned to slide between the base plate and the lock mount.

7. The apparatus of claim 5, wherein:

the first plate comprises a slot oriented along the second lateral axis; and the lock comprises a spring-loaded push pin that extends through the slot when the lock fastens the first plate to the base plate.

8. The apparatus of claim 1, wherein the lock comprises a spring-loaded push pin that extends outward from the lock when the lock resides in an unlocked state, and that extends through the lock mount and an opening in the base plate when the lock resides in a locked state.

9. The apparatus of claim 1, wherein the base plate is welded to the post.

10. The apparatus of claim 1, wherein the first plate has a pair of guide flanges, each guide flange of the pair of guide flanges slidably engaging a sidewall of a pair of sidewalls of the lock mount.

11. The apparatus of claim 10, wherein each sidewall of the pair of sidewalls has a portion spaced from the base plate to define a gap in which the first plate is disposed.

12. The apparatus of claim 1, wherein the post comprises a tube and a threaded rod fixedly disposed in the tube.

13. An apparatus for securely displaying a product, the apparatus comprising:

a post comprising a tube and a threaded rod fixedly disposed in the tube;

a cradle assembly supported by the post, the cradle assembly comprising a base plate and a plurality of plates slidably engaged with the base plate, each plate of the plurality of plates comprising an arm, the arms of first, second, and third plates of the plurality of plates engaging first, second, and third sides of the product, respectively;

a lock mount fixed to, and extending outward from, the base plate, the post, or the base plate and the post;

a lock disposed in the lock mount, the lock engaging the first plate of the plurality of plates to fasten the first plate of the plurality of plates to the base plate; and an anti-rotation washer engaged with the threaded rod, the anti-rotation washer having a plurality of flanges configured to engage a channel in a display fixture to which the apparatus is mounted.

14. An apparatus for securely displaying a product, the apparatus comprising:

a post;

a cradle assembly supported by the post, the cradle assembly comprising a base plate and a plurality of plates slidably engaged with the base plate, each plate of the plurality of plates comprising an arm, the arms of first, second, and third plates of the plurality of plates engaging first, second, and third sides of the product, respectively;

a lock mount fixed to, and extending outward from, the base plate, the post, or the base plate and the post; and a lock disposed in the lock mount, the lock engaging the first plate of the plurality of plates to fasten the first plate of the plurality of plates to the base plate, wherein the arm of each plate of the plurality of plates is positioned to not obstruct a side button of the product.

15. An apparatus for securely displaying a product, the apparatus comprising:

a post;

a cradle assembly supported by the post, the cradle assembly comprising a base plate and a plurality of plates slidably engaged with the base plate, each plate of the plurality of plates comprising an arm, the arms of first, second, and third plates of the plurality of plates engaging first, second, and third sides of the product, respectively;

a lock mount fixed to, and extending outward from, the base plate, the post, or the base plate and the post; and a lock disposed in the lock mount, the lock engaging the first plate of the plurality of plates to fasten the first plate of the plurality of plates to the base plate, wherein the arm of at least one plate of the plurality of plates is positioned to obstruct access to a card slot of the product.

16. The apparatus of claim 1, wherein the cradle assembly, the lock mount, and the post are composed of tamper-proof, heat-treated steel.

17. An apparatus for securely displaying a product, the apparatus comprising:

a post;

a cradle assembly supported by the post, the cradle assembly comprising a base plate welded to the post and further comprising a plurality of plates slidably engaged with the base plate, each plate of the plurality of plates comprising an arm, the arms of first, second, and third plates of the plurality of plates engaging first, second, and third sides of the product, respectively; and a lock engaging the first plate of the plurality of plates to fasten the first plate of the plurality of plates to the base plate;

wherein the lock comprises a spring-loaded push pin, the spring-loaded push pin engaging the first plate when pushed into the lock, and wherein the lock is released with a key that disengages the spring-loaded push pin from the first plate.

18. The apparatus of claim 17, wherein the lock is centered on the cradle assembly.

19. The apparatus of claim 17, wherein:

the base plate has an opening;

the lock mount has an opening; and the apparatus further comprises a lock mount welded to the base plate, wherein the lock is disposed in the opening in the base plate and the opening in the lock mount.

20. An apparatus for securely displaying a product, the apparatus comprising:

a post;

a cradle assembly supported by the post, the cradle assembly comprising a base plate and a plurality of plates slidably engaged with the base plate, each plate of the plurality of plates comprising an arm, the arms of first, second, and third plates of the plurality of plates engaging first, second, and third sides of the product, respectively;

a lock mount fixed to, and extending outward from, the base plate, the post, or the base plate and the post; and an electronic lock disposed in the lock mount, the electronic lock engaging the first plate of the plurality of plates to fasten the first plate of the plurality of plates to the base plate;

wherein the second and third plates are a pair of lateral plates that slide along a first lateral axis relative to one another to adjust a first lateral dimension of the cradle assembly, the arms of the second and third plates engaging first and second lateral sides of the product, respectively.

21. An apparatus for securely displaying a product, the apparatus comprising:

a post;

a cradle assembly supported by the post, the cradle assembly comprising a base plate and a plurality of plates slidably engaged with the base plate, each plate of the plurality of plates comprising an arm, the arms of first, second, and third plates of the plurality of plates engaging first, second, and third sides of the product, respectively;

a lock mount fixed to, and extending outward from, the base plate, the post, or the base plate and the post; and a lock having an opening configured to be engaged by a key, the lock being disposed in the lock mount, the lock engaging the first plate of the plurality of plates to fasten the first plate of the plurality of plates to the base plate;

wherein the lock comprises a spring-loaded push pin that extends outward from the lock when the lock resides in an unlocked state, and that extends through the lock mount and an opening in the base plate when the lock resides in a locked state.

22. The apparatus of claim 2, wherein each slot is notched to define a number of discrete positions for the lateral plate.

* * * * *